Figure 1:
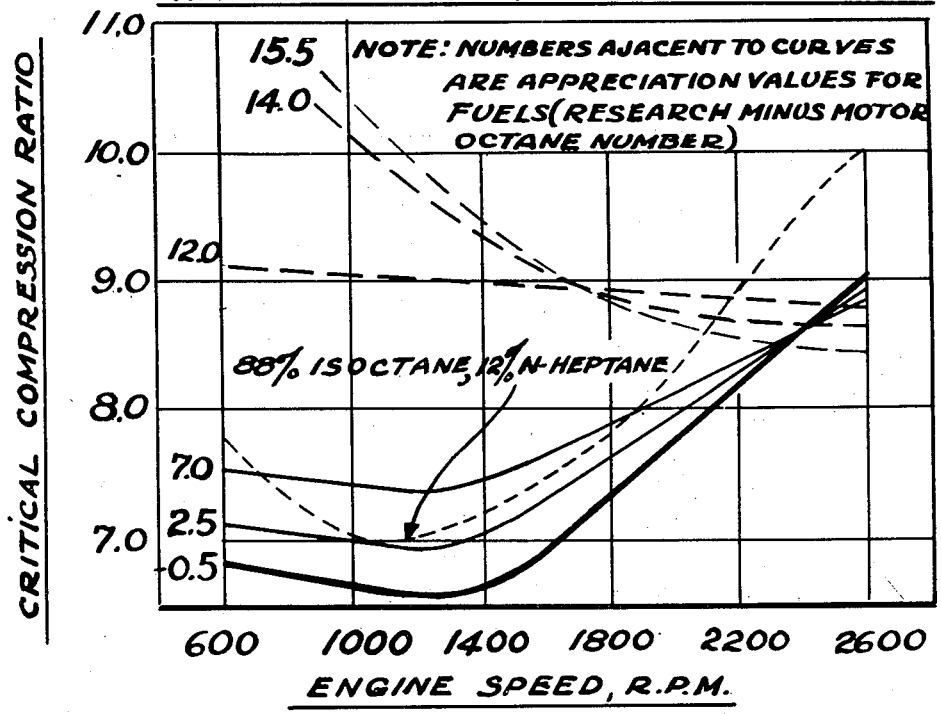

Nov. 13, 1951   W. C. HOWELL, JR   2,575,275
SAFETY FUEL FOR AUTOMOBILE TYPE MARINE ENGINES
Filed April 15, 1949   5 Sheets-Sheet 2

Fig.—2

Nov. 13, 1951 W. C. HOWELL, JR 2,575,275
SAFETY FUEL FOR AUTOMOBILE TYPE MARINE ENGINES
Filed April 15, 1949 5 Sheets-Sheet 3

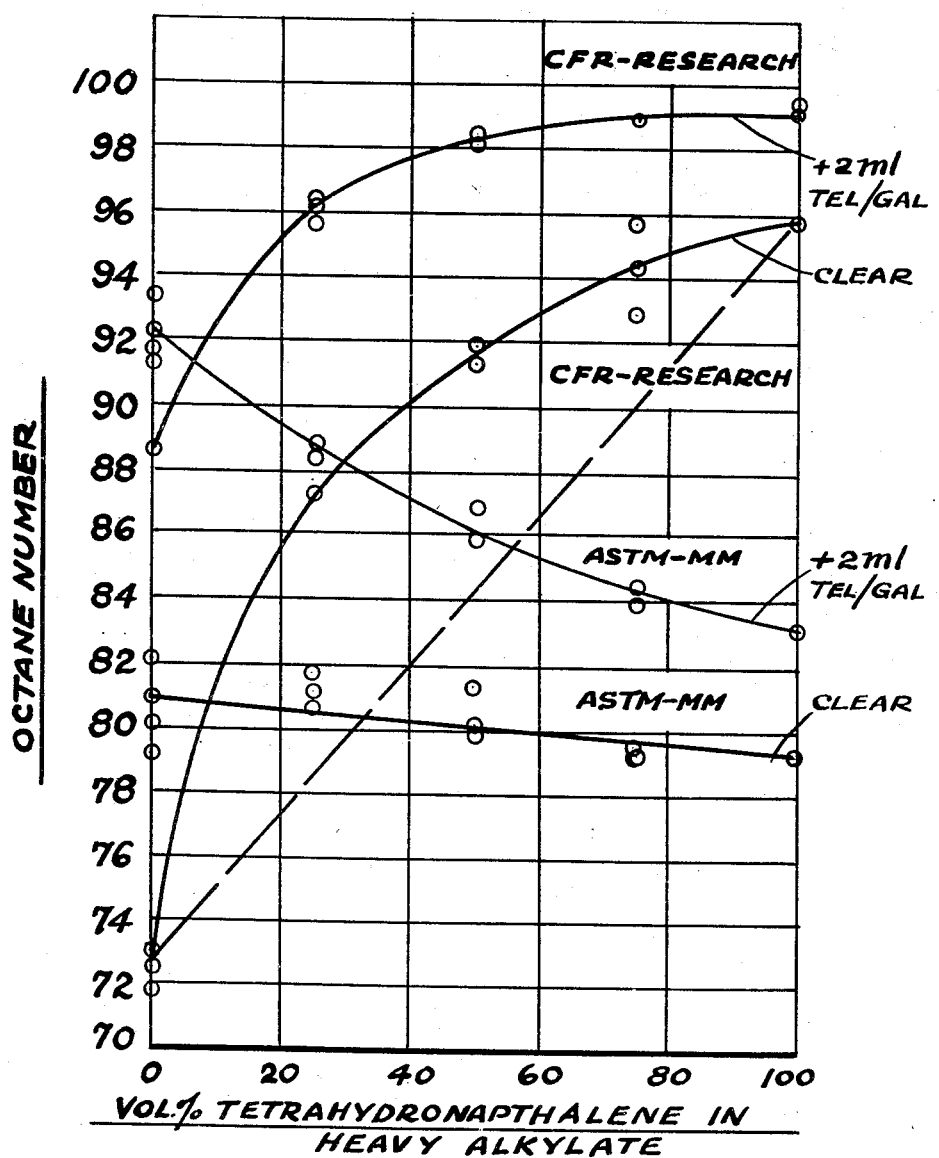

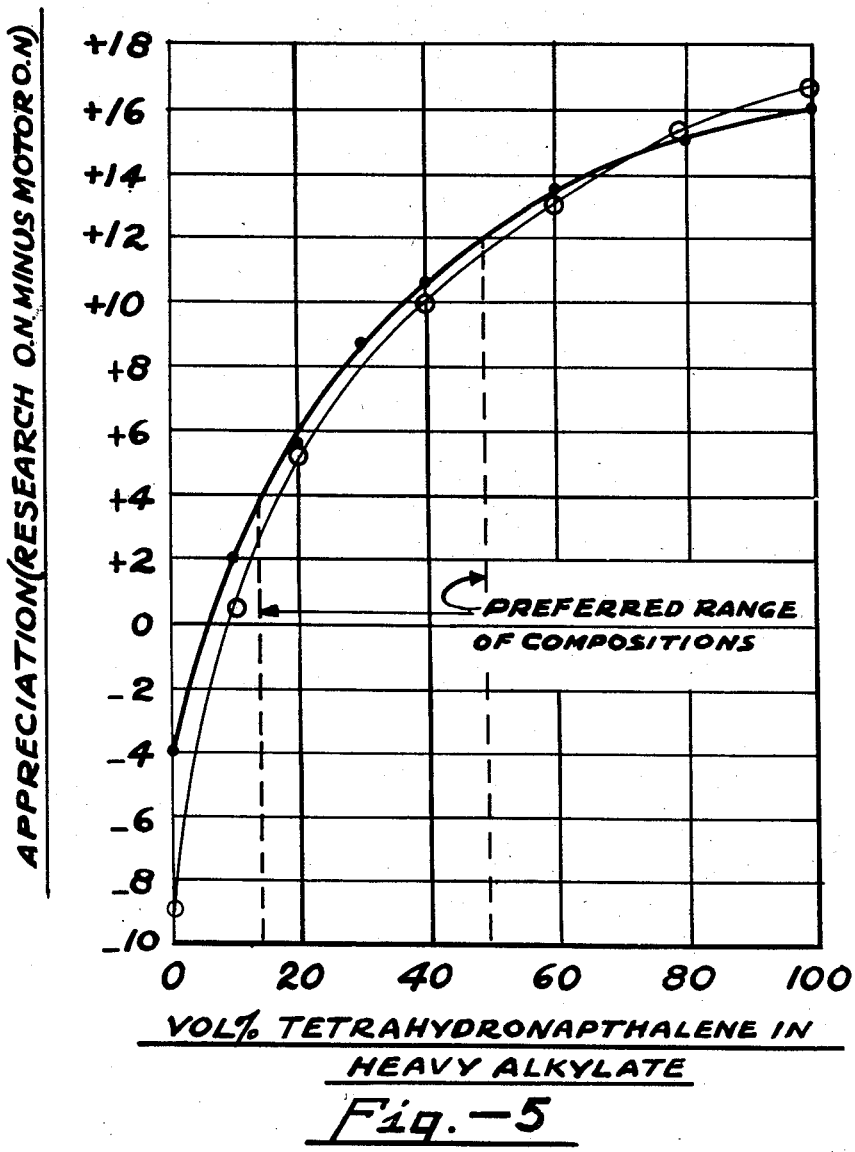

Patented Nov. 13, 1951

2,575,275

UNITED STATES PATENT OFFICE 2,575,275

SAFETY FUEL FOR AUTOMOBILE TYPE MARINE ENGINES

William C. Howell, Jr., Union, N. J., assignor to Standard Oil Development Company, a corporation of Delaware Application April 15, 1949, Serial No. 87,609

6 Claims. (Cl. 44—69)

This invention relates to an improved safety fuel for spark-ignited internal combustion engines and more particularly it relates to a safety fuel for marine and automobile type engines. In accordance with this invention a safety fuel composition is provided having optimum characteristics of low and high speed engine operation. The fuel composition of this invention consists essentially of a blend of heavy alkylate and tetrahydronaphthalene.

A need is felt at the present time for the development of a suitable safety fuel for use in spark-ignited marine type engines; for example, for use in the automobile type engines used in shallow draft boats. At the same time it is contemplated that safety fuels suitable for such application would also find some use in ground vehicle applications. It is, therefore, the principal object of this invention to provide a safety fuel composition having desirable characteristics for use in automobile type marine engines.

The marine engines used in shallow draft boats are basically of the same type as the engines used in automobiles and trucks. While there are some differences in the type of operation encountered in the marine and land-vehicle applications of these engines, nevertheless the fuel requirements are essentially similar, particularly with respect to the antiknock characteristics of the fuel. Thus while there may be differences in the absolute antiknock quality required in the two types of application of these engines, or even between different engines in a given application, both types require fuel that will give satisfactory operation under both low speed and high speed conditions. Moreover, the effect of engine speed on antiknock requirements is similar for marine and automobile engines. It is to be understood, therefore, that while reference is made throughout this specification to the fuel requirements of marine engines, the same also applies in every case to automobile and similar type engines.

Essentially a safety fuel may be defined as being a fuel of high flash point. It is usually considered that a naphtha having a minimum flash point of 100° F., is a safety fuel. While no particular problem is concerned in obtaining a naphtha having suitable volatility and flash point characteristics, it is difficult to obtain one suitable as engine-fuel from the view point of antiknock performance. In particular it is possible to select compositions suitable for use as safety fuels which would give suitable low speed engine antiknock performance but which would not give suitable high speed engine antiknock performance Similarly, it is possible to select fuels which could be used as safety fuels which will give adequate high speed engine performance, but which will not give suitable low speed engine performance. Furthermore, the problem of selecting a suitable fuel has been complicated by the discovery that for optimum performance a safety fuel should have a particular critical relationship between its low speed and high speed engine performance characteristics. It is, therefore, the principal object of this invention to provide a safety fuel composition providing suitable low speed and high speed engine performance and having the optimum relationship of low speed and high speed performance characteristics.

As indicated, in considering the fuel requirements of a marine type engine, it is convenient to refer to both the high and low speed engine antiknock requirements. Thus it has long been appreciated that different fuel characteristics are required to satisfy the low and high speed engine antiknock requirements. For this reason particular tests have been developed to evaluate both the low speed and the high speed antiknock performance characteristics of fuels. The Research octane number of a fuel has been found to correlate well with full scale automobile engine, low speed, anti-knock performance, while the Motor octane number has been found to correlate well with full scale automobile engine high speed, anti-knock performance. The Research octane number of the fuel may be determined by ASTM test designated as D908-47T and the Motor octane number of the fuel may be determined by means of ASTM test D357-47. By evaluating a fuel composition according to these two tests it is possible to determine the adaptability of the fuel for mild, low speed operation, and for the more severe type of operation generally encountered under high speed conditions. Throughout this disclosure, therefore, reference will be made to the Research octane number and to the Motor octane number rating of the compositions disclosed to demonstrate the adaptability of these fuel compositions for low and high speed engine performance.

In general it has been appreciated that a suitable automobile engine or marine fuel should have a higher Research octane number than Motor octane number, in order to achieve suitable low speed and high speed engine performance. Consequently, the term "appreciation," which may be defined to be the Research octane number minus the Motor octane number, has been referred to as an indication of the performance characteristics of fuels. Thus a fuel having a Research octane number of 88, and a Motor octane number of 80 has an appreciation of 8. As a particular feature of this invention it has been established that the appreciation of a fuel should fall within a critical range in order to secure optimum performance characteristics. More particularly, it has been discovered that the appreciation of the fuel should be in the range of about 4 to 12, and that this range of appreciation permits optimum engine performance.

In considering compositions which could be employed as marine safety fuels, it has been found that those having suitable flash points and volatility characteristics are not always suitable to satisfy both high and low speed engine requirements. However, in accordance with this invention it has been found that the novel composition consisting of tetrahydronaphthalene and alkylate boiling above about 300° F., provides a composition ideally suited for satisfying low and high speed engine requirements, while having suitable flash points and volatility characteristics for use as a safety fuel.

In order to establish the characteristics required in a fuel to satisfy both low and high speed engine operation, a series of tests were conducted at varying engine speeds, while using fuels of varying appreciations. By determining the critical compression ratio for these fuels at the different engine speeds, it was possible to establish the optimum characteristics of a fuel best adapted to satisfy low and high speed engine requirements. The tests were conducted in a single cylinder C. F. R. engine. Engines of the type designated are conventionally used for octane number measurement and are provided with means to vary their compression ratio while being operated. In the tests conducted, therefore, with the engine operating at a given speed with a given fuel the compression ratio was gradually increased until a standard knock intensity known as a "trace knock" was encountered. The compression ratio at which trace knock was encountered was designated as the critical compression ratio. It may be noted that in effect the determination of a critical compression ratio for a given fuel at a given engine speed is actually a determination of the amount of knock-free power which can be obtained from the engine under these conditions. It may further be noted that the type of test described above is a well accepted method for rating the anti-knock performance of motor fuel blends.

The fuels used in establishing the optimum characteristics of fuels for marine engines covered the range of ASTM-Motor octane numbers from approximately 80 to 90. Since the results obtained with any one series of fuels having the same Motor octane number were similar with respect to establishing the critical nature of Research minus Motor octane number appreciation, for purposes of illustration the series of blends having 88 Motor octane number have been selected as typical. These fuels were prepared by blending mixtures of iso-octane, normal heptane, di-isobutylene and toluene so as to provide compositions having varying appreciations. The nature of the fuel compositions prepared are indicated in Table I below.

TABLE I

| Fuel No. | 1 | 2 | 3 | 4 | 5 | 6 |
|---|---|---|---|---|---|---|
| Research Minus Motor Octane Number (Appreciation) | −0.6 | +2.3 | +7.1 | +12.0 | +14.2 | +15.6 |
| Vol. Per Cent Di-isobutylene | 0 | 7.5 | 21.5 | 44.2 | 70.0 | 100.0 |
| Vol. Per Cent Primary Ref. Fuels [1] | 100.0 | 92.5 | 78.5 | 55.8 | 30.0 | 0.0 |
| O. N. of Primary Ref. Fuel Base Stock [2] | 87.5 | 84.5 | 80.0 | 80.0 | 80.0 | |

[1] Isooctane (2,2,4 trimethyl pentane) and normal heptane.
[2] Under all test conditions, by definition.

Figure 2:
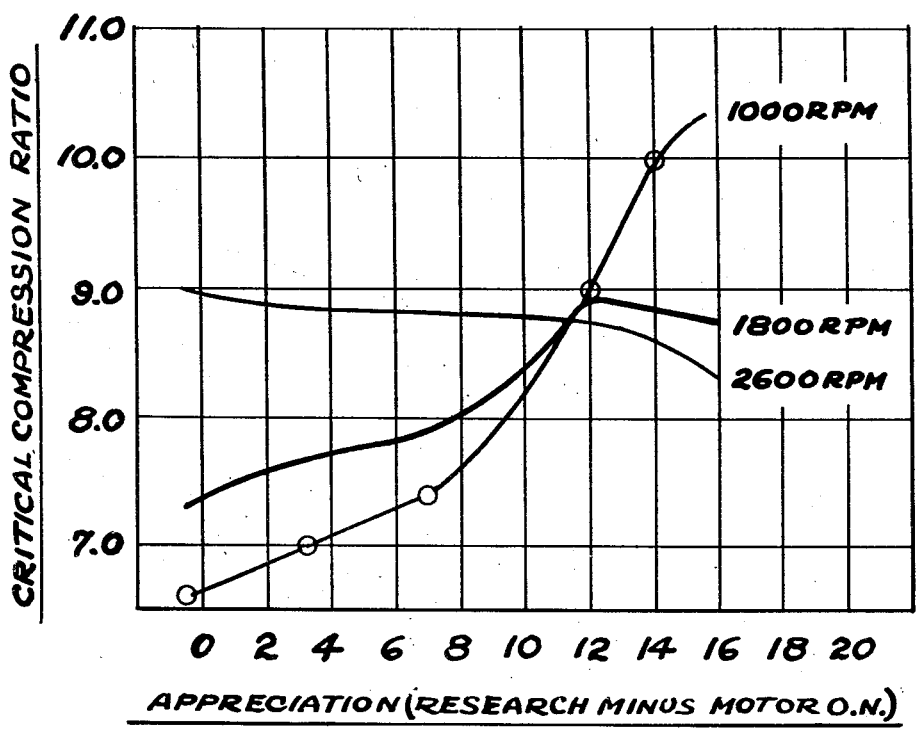
Figure 3:
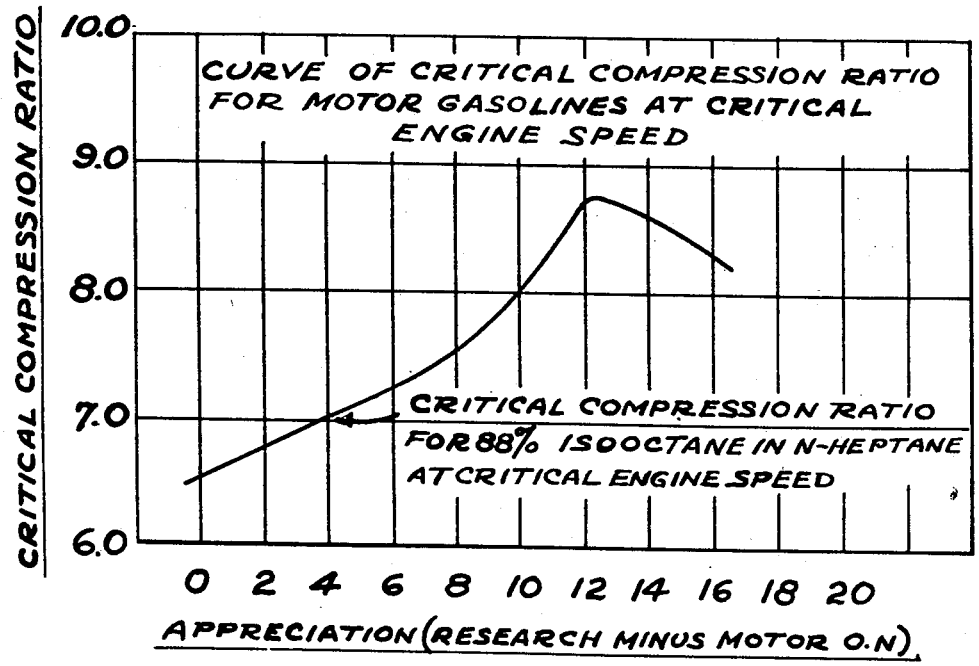

Referring now to the drawings, the results of the type of tests indicated are graphically presented. Thus Figure 1 of the drawings shows the performance of fuels of varying appreciation plotted in terms of critical compression ratio of the engine versus the engine speed in revolutions per minute. Figure 2 shows the variation in critical compression ratio as plotted against appreciation for engine speeds of 1000; 1800 and 2600 R. P. M.; Figure 3 similarly shows a plot of the critical compression ratio at the critical engine speed for 88 Motor octane fuels; Figure 4 shows the octane number characteristics of tetrahydronaphthalene and heavy alkylate blends; and Figure 5 shows the octane number appreciation of tetrahydronaphthalene and heavy alkylate blends.

Referring now to Figure 1, test results are plotted showing engine performance characteristics of fuels of varying appreciations. Thus fuels having appreciations of −0.5, 2.5, 7.0, 12.0, 14.0 and 15.5 as identified in Table I were utilized. The critical compression ratios of these fuels were then plotted against the engine speed in revolutions per minute to obtain the curves represented in Figure 1. In addition a curve is represented showing the critical compression ratio at varying engine speeds of an 88 octane number blend of the internationally standardized primary reference fuels iso-octane and normal heptane. It will be noted from Figure 1 that over the engine speed range the critical compression ratio obtainable with a fuel of given Motor octane number varies markedly with the appreciation of the fuel. For example, the curve for a fuel having an appreciation of 7 indicates that the highest critical compression ratio at which knocking is unobjectionable over the entire speed range is 7.4. At critical compression ratios higher than this value objectionable knocking will occur at at least one engine speed. For example, at a compression ratio of about 8 knocking will occur at engine speeds below about 1900 R. P. M. Similarly, in the case of a fuel having an appreciation of 14, the highest critical compression ratio which may be used satisfactorily over the entire range of engine speeds is about 8.6. In the case of this fuel, knocking would occur only at speeds higher than 2600 R. P. M., when using 8.6 as the compression ratio. Referring generally to Figure 1, it is apparent that a fuel having an appreciation slightly less than 12 will permit operation at the highest critical compression ratio throughout the entire engine speed range. Such a fuel will permit operation without knocking from 600 to 2600 R. P. M., at compression ratios of about 8.8. Restating this observation as derived from Figure 1, it may be observed that for best engine performance under both low and high speed conditions of operation, a fuel should have a particular critical appreciation. If this property of the fuel is not obtained, then the compression ratio at which the fuel may be burned will be materially lower under either high or low speed conditions of operation, or in other words, an excessive difference in knock free power levels will be exhibited by the fuel under low and high speed operating conditions.

Referring now to Figure 2, a somewhat different plot is shown illustrating the critical compression ratios for fuels of varying appreciation, at engine speeds of 1000, 1800 and 2600 R. P. M. The indicated speeds are considered representative of low speed, medium speed, and high speed engine operation, respectively. As in the case of Figure 1, all fuels employed in establishing the curves of Figure 2 were fuels having an ASTM Motor octane number of 88 and had the compositions indicated in Table I. It will be seen from Figure 2, that for low speed engine operation as indicated by the curve for 1000 R. P. M., performance improves directly as fuel appreciation is increased. On the other hand under high speed operating conditions, as indicated by the 2600 R. P. M. curve, the fuel's performance decreases continually with increase in fuel appreciation and particularly drops off markedly above appreciations of about 12. The performance of the engine under intermediate speed conditions as indicated by the 1800 R. P. M. curve is seen to improve with increasing fuel appreciation up to about 12, but thereafter drops off with increases of appreciation beyond this point. It is apparent from this curve that fuels of very low or very high appreciation will not satisfy the requirements of an engine under all engine speeds. Consequently, in order to select a fuel best adapted for performance under all engine speeds, it is necessary to consider the requirements indicated by Figure 2. Again as demonstrated by Figure 2, as well as by Figure 1, it is to be seen that a fuel having an appreciation of somewhat less than 12 is best adapted for satisfying both low and high speed engine operating requirements.

In order to illustrate more clearly the criticality of fuel appreciation with engine operating conditions, a somewhat different plot is presented in Figure 3. This figure which is derived from the data of Figure 1, shows the relation between octane number appreciation, and critical compressions ratio for 88 Motor octane number fuels at the critical engine speed. The critical engine speed is defined as the speed at which an engine of a given compression ratio has its highest antiknock requirement. For example, in Figure 1, the critical engine speed of a 6.8 compression ratio engine is 1200 R. P. M., this being the speed at which the antiknock quality of the fuel limits the performance of the engine. In other words, the 88 Motor octane number fuel required to satisfy the engine at this point has an appreciation of 2.5 This 6:8 compression ratio versus 2.5 appreciation represents one point from which the curve in Figure 3 was plotted. Other points, obtained in a similar manner from Figure 1, are 6.4 C. R. versus −0.5 appreciation; 7.4 C. R. versus 7.0 appreciation; 8.8 C. R. versus 12.0 appreciation; etc. It will be seen from Figure 3 that an engine of 7 compression ratio is satisfied by a blend of 88% iso-octane in normal heptane at its critical engine speed. This blend of iso-octane and normal heptane, by definition, has an octane number of 88 and has 0 appreciation. It will further be seen from Figure 3 that other fuels having 88 octane number and having an appreciation of less than 4 will not provide critical compression ratios as great as that of the reference fuel, only providing compression ratios of about 6.5 to 7.0. Furthermore, as the fuel appreciation is increased, engine performance is improved as evidenced by the increase in critical compression ratios. However, increases in appreciation, above 12, do not permit further increase in engine performance but actually lead to a decrease in engine performance below that attained with a fuel of 12 appreciation. In this connection it will be recalled that by referring to Figure 2, it was demonstrated that increase in appreciation above 12 resulted in improvement in low speed engine performance, although reducing high speed engine performance. Therefore, in Figure 3, while those fuels having higher than 12 appreciation will permit better low speed performance than those having lower appreciations, these fuels would be handicapped by poor high speed performance. Since at the critical compression ratio for a fuel having an appreciation of 12; that is about 8.7 compression ratio, high speed rather than low speed performance is limiting, it is evident that fuels of higher than 12 appreciation are undesirable.

Consequently, it has been developed in connection with Figures 1, 2 and 3, that optimum engine performance under both low and high speed operating conditions will be obtained with fuels having an appreciation of about 4 to 12, and preferably having an appreciation of about 12. In accordance with this requirement, fuel compositions are herein disclosed having appreciations falling within the range of 4 to 12. As seated, these fuel compositions are blends of the alkylation products of isoparaffins and olefins, which products boil in the range of 300° F. to 450° F., and tetrahydronaphthalene. The physical properties of tetrahydronaphthalene are indicated in Table II below, and similarly, the physical properties of a suitable alkylate fraction to be used in the practice of this invention are indicated in Table III below.

TABLE II

*Physical properties of tetrahydronaphthalene*

| | |
|---|---|
| Cottrell B. P., °F.: | |
|   IBP | 405.5 |
|   50% | 406.8 |
| Specific gravity at 20° C | 0.969 |
| Refractive index, $N_D^{20}$ | 1.5421 |
| Wt. percent S(turbidimetric) | 0.0006 |
| Estimated purity, vol. percent | 95+ |
| Flash point (Tag, C. C.), °F | 150 |
| Research octane number | 96 |
| Motor method octane number | 79 |

TABLE III

*Heavy alkylate*

| | |
|---|---|
| ASTM distillation, °F: | |
|   IBP | 325 |
|   10% cond | 342 |
|   50% cond | 361 |
|   90% cond | 381 |
|   FBP | 399 |
| Gravity, °API | 55.5 |
| Flash point (Tag, C. C.), °F | 110 |
| Research octane number | 70 |
| Motor method octane number | 78 |

It will be noted from these tables that the tetrahydronaphthalene has a boiling point of about 406° F., placing this compound in the volatility range of safety fuels. Similarly, the heavy alkylate indicated has a boiling range falling within the safety fuel boiling range. In addition it will be observed that the flash points of both the alkylate and the tetrahydronaphthalene are above 100° F. The data given in Tables II and III, as regards the Research and Motor method octane numbers of the alkylate and the tetrahydronaphthalene are particularly significant. It will be observed that tetrahydronaphthalene has a Research octane number of 96, and a Motor method octane number of 79, indicating an appreciation of +17. The alkylate fraction, however, is shown to have a Research octane number of 70 and a motor method octane number of 78, indicating an appreciation of −8. Insofar as the tetrahydronaphthalene has a high positive appreciation, while the alkylate fraction has a negative appreciation, it has been discovered that these two constituents are particularly adaptable for blending in order to obtain a fuel having optimum appreciation. Moreover, the advantage of blending these two materials together is greater than would be predicted on the assumption that each component contributes to the anti-knock quality of the finished blend in direct proportion to its concentration in that blend. For example, Figure 4 shows the anti-knock blending relationships between tetrahydronaphthalene and heavy alkylate, in both the absence and presence of tetraethyl lead. It will be noted from Figure 4 that while it will be expected on the basis of the octane ratings of the separate constituents that a blend of 30% tetrahydronaphthalene in heavy alkylate, for example, would rate 80 Research octane number and 81 Motor octane number, with an appreciation of minus 1, actually a blend of this composition has an octane rating of 88 Research and 81 Motor, with an appreciation of 7. Unexpectedly high octane ratings are likewise shown in Figure 4 to exist for other blends of tetrahydronaphthalene and heavy alkylate.

The Research minus Motor octane number obtained with various blends of tetrahydronaphthalene and heavy alkylate is shown in Figure 5. The unusual advantage in appreciation obtained by blending these constituents is evident from Figure 5, and it is further evident that this advantage holds either in the absence or presence of tetraethyl lead antiknock compound. From Figure 5 it can be deduced that the preferred concentrations, wherein appreciations of from 4 to 12 are obtained, lies in the range of from about 15 to 50 volume percent tetrahydronaphthalene in heavy alkylate. Thus the heavy alkylate, and the tetrahydronaphthalene may be blended in suitable proportions so as to provide a fuel composition boiling in the safety fuel range having an appreciation in the range of 4 to 12. It is, therefore, to be understood that in accordance with this invention heavy alkylate fractions and tetrahydronaphthalene are blended in sufficient proportions as to yield compositions having appreciations of 4 to 12.

The tetrahydronaphthalene to be employed in the fuel compositions of this invention is a compound which is commercially available in reasonably high purity. Consequently, no details will be given as to the process by which tetrahydronaphthalene is prepared. Suitable alkylate fractions for use in the composition of this invention are most broadly alkylation fractions having a boiling range of about 300° F. to 450° F., as obtained by the conventional alkylation of olefins and isoparaffins. Thus by alkylating isobutane with propylene, butylenes and, or pentenes, in the presence of sulfuric acid, or hydrofluoric acid catalysts, a fraction may be obtained having a boiling point in the range of about 300° F., to about 450° F., and generally having Motor octane numbers in the range of 70 to 90. As indicated, such alkylates are characterized by negative appreciations ranging from about −18 to about −6. The alkylate fractions which are preferably employed in the practice of this invention are those having a Motor octane number of about 74 to 85. Indicated in Table IV below are properties of typical alkylate fractions boiling in the range of 300 to 400° F., as obtained from commercial alkylation operations.

TABLE IV

Octane number data on heavy alkylate fractions

[Approximately 300–400° F. Boiling Range.]

| Alkylate Type (Olefin Feed) | Research O. N., Clear | Motor O. N., Clear | Research Minus Motor O. N. |
|---|---|---|---|
| butenes-pentenes | 65 | 75 | −10 |
| Do | 70 | 78 | −8 |
| isobutylene | 60 | 80 | −20 |
| normal butene | 69 | 81 | −12 |
| Do | 78 | 90 | −12 |
| propylene-butenes | 62 | 80 | −18 |

The alkylation operations by which these alkylate fractions were produced, utilized sulfuric acid as a catalyst and isobutane as the reactant with the olefins indicated in the table. It will be observed that each of the alkylate fractions indicated in the table had negative appreciations, and consequently were adapted for use in the practice of this invention.

As described, therefore, this invention relates to a safety fuel composition prepared by blending two constituents each of which is by itself not adapted for use as a safety fuel. Thus tetrahydronaphthalene having a poor Motor octane number, as compared to its Research octane number is blended with alkylate fractions having poor Research octane rating but good Motor octane rating. By blending these constitutents, it is possible to obtain a fuel composition having the optimum appreciation for best over-all engine operation. To achieve this object, from 15% to 50% of tetrahydronaphthalene by volume is to be blended in alkylate fractions having boiling ranges of about 300 to 400, or 450° F. It is apparent that such fuel blends may include tetraethyl lead or other lead alkyl anti-detonants according to conventional practice. In this connection it is contemplated that from 1 to 4 cc. of tetraethyl lead may be employed per gallon of fuel. Further, other materials suitable for use as safety fuel components may be employed.

What is claimed is:

1. A safety fuel composition characterized by Research minus Motor octane number appreciations of 4 to 12 consisting essentially of blends of tetrahydronaphthalene and alkylate fractions boiling in the range of about 300° F. to 450° F. said composition containing about 15 to 50 volume percent of the said tetrahydronaphthalene.

2. A safety fuel composition characterized by Research minus Motor octane number appreciations of 4 to 12 consisting essentially of blends of tetrahydronaphthalene and alkylate fractions boiling in the range of about 300° F. to 450° F. and a knock suppressing concentration of a lead anti-knock agent said composition containing about 15 to 50 volume percent of the said tetrahydronaphthalene.

3. The composition defined by claim 1 having an appreciation of about 12.

4. The composition defined by claim 2 having an appreciation of about 12.

5. The composition defined by claim 2 in which the said knock suppressing concentration of a lead anti-knock agent constitutes 1 to 4 cc. per gallon of tetraethyl lead.

6. The composition defined by claim 1 in which said alkylate fractions have motor octane numbers of about 74 to 85.

WILLIAM C. HOWELL, JR.

REFERENCES CITED

The following references are of record in the file of this patent:

UNITED STATES PATENTS

| Number | Name | Date |
|---|---|---|
| 2,356,647 | Brown | Aug. 22, 1944 |

FOREIGN PATENTS

| Number | Country | Date |
|---|---|---|
| 500,066 | Great Britain | Feb. 2, 1939 |